US005567090A

United States Patent [19]
Basak et al.

[11] Patent Number: 5,567,090
[45] Date of Patent: Oct. 22, 1996

[54] METHOD AND APPARATUS FOR SEPARATING SOLIDS FROM GAS IN A HIGH PRESSURE SOLIDS-GAS STREAM UTILIZING A PACKED BED OF THE SOLIDS

[75] Inventors: Arun K. Basak, Karhula, Finland; Karukkampalayam M. Sellakumar, San Diego, Calif.

[73] Assignee: Foster Wheeler Energia Oy, Karhula, Finland

[21] Appl. No.: 51,969

[22] Filed: Apr. 22, 1993

[51] Int. Cl.[6] .................................................. B65G 53/60
[52] U.S. Cl. ........................... 406/155; 406/170; 406/171; 406/175; 406/181; 406/195; 55/344; 55/523
[58] Field of Search .................................. 406/170, 171, 406/172, 175, 154, 155, 168, 181, 195; 55/252, 344, 396, 523

[56] References Cited

U.S. PATENT DOCUMENTS

| | | | |
|---|---|---|---|
| 2,684,868 | 7/1954 | Berg | 406/146 |
| 2,684,870 | 7/1954 | Berg | 406/142 |
| 2,684,872 | 7/1954 | Berg | 406/124 |
| 2,684,873 | 7/1954 | Berg | 406/142 |
| 2,901,421 | 8/1959 | Bourguet et al. | 406/195 X |
| 4,247,227 | 1/1981 | Göhler et al. | 406/172 X |
| 4,734,110 | 3/1988 | Premel et al. | 406/172 X |
| 4,808,043 | 2/1989 | Le Marrec et al. | 406/155 X |

OTHER PUBLICATIONS

Institute of Gas Technology, "Solids Pressure Reduction Without Lockhoppers: The Restricted Pipe Discharge System," Knowlton et al, No. 255, vol. 83, pp. 64–73; at least as early as Jun. 1990.

Institute of Gas Technology, "Continuous Depressurization of Solids Using a Restricted Pipe Discharge System," Knowlton et al, No. 276, vol. 86, pp. 61–72; at least as early as Apr. 1992.

Primary Examiner—Andrew C. Pike
Attorney, Agent, or Firm—Nixon & Vanderhye

[57] ABSTRACT

Separation of a high temperature (e.g., 300°–1200° C.) and high pressure (e.g., 2–20 bar) solids-gas stream from a pressurized fluidized bed reactor into solids and gas while reducing the pressure of both the gas and solids takes place in a vertical de-entrainment vessel having a packed bed of solids within it. The possibility of fluidization of the solids is minimized by causing the velocity of the gas component of the solids-gas stream to be reduced during, or just prior to, introduction of the gas into the packed bed of solids, e.g., by providing an expanding conical end to the inlet for the solids-gas stream into the vessel. A gas permeable solids impermeable element may also or alternatively be connected to the inlet and extend toward (optionally all the way to) the side wall of the vessel, to substantially prevent fluidization. The fluidization-preventing element may be a perforated plate, ceramic filter, or wire mesh screen, and may have gradually increasing gas permeability from the inlet to the vessel side wall. A plurality of inlets flow into the vessel, and at least one separated gas and solids outlets leads from the vessel to a low (e.g., atmospheric) pressure area.

23 Claims, 2 Drawing Sheets

METHOD AND APPARATUS FOR SEPARATING SOLIDS FROM GAS IN A HIGH PRESSURE SOLIDS-GAS STREAM UTILIZING A PACKED BED OF THE SOLIDS

BACKGROUND OF THE INVENTION

This invention relates to a method and an apparatus for handling high pressure material, particularly to a method for reducing pressure of a high-pressure solids-gas mixture and for separating the solids from the solids-gas mixture in a vessel. The vessel is in communication with a reactor that is operated under a pressure of at least about 2 bars, and serves to maintain desired reactions, such as the combustion or gasification of fuel. The vessel serves to remove ash or other particulate material from the reactor.

The term "solids", as used in the specification and claims, refers to all residues known to a person skilled in the art that may be obtained from reactions taking place in pressurized reactors, such as circulating fluidized bed reactors.

A known method for reducing the pressure of gas-solids mixtures is disclosed in Knowlton, T. M.; Findlay, J. G.; and Chan, I., "Continuous Depressurization of Solids Using a Restricted Pipe Discharge System", Presented at the 1989 AIChe Annual Meeting, San Francisco, Calif., Nov. 5–10, 1989. In this reference, a method for de-pressurizing a gas-solids mixture by using a Restricted Pipe Discharge System ("RPDS") is disclosed. In the RPDS, solids are discharged in moving packed-bed flow from higher pressure to lower pressure through a pipe restricted at its outlet, while the gas is forced to flow through the packed bed of solids, thus causing de-pressurizing. In U.S. Pat. Nos. 2,684,868, 2,684,870, 2,684,872, and 2,684,873 methods for conveying or transporting of granular solids, which can be used in the RPDS, are disclosed in more detail.

Typically, the main set of components of the RPDS are depressurizing piping ("transporting pipe"), a de-entrainment vessel wherein a packed bed of solid material is maintained for acting as a solids flow restriction at the end of the transporting pipe, and means for controlling the flow of the solids from the de-entrainment vessel.

An RPDS may be successfully utilized, for example, in connection with Pressurized Fluidized Bed reactors such as Pressurized Fluidized Bed Combustors or Gasifiers and processes executed therein. For example, in a system where a Pressurized Fluidized Bed Gasifier, which provides a partial gasification of fuel, is connected to a Fluidized Bed Combustor for oxidizing the residue char from the gasification, and in a transportation system for conveying the solids resulting from a partial gasification, such as char, to the final combustion, the RPDS may be successfully employed. Any corresponding processes can be equipped with an RPDS as well.

In such systems, the reactions take place at elevated pressure, e.g., 2–20 bar, and at elevated temperature, preferably about 1200° C., and residues are produced which should be subjected to further processing at lower pressure. The solids discharged from a Pressurized Fluidized Bed reactor may be introduced to the RPDS either with or without first cooling the solids. If cooling is utilized, the temperature of the solids may be lowered even to about 300° C. temperature if the temperature of the solids-gas stream prior to introduction into the de-entrainment vessel is about 300°–1200° C. (e.g., about 300°–799° C.); otherwise, the temperature is still reduced to below that of the reactor, e.g., to about 800°–1200° C.

In the prior art, a necessary feature of the RPDS system, in order to achieve continuous movement of the solids with a simultaneous pressure drop of the gas, is to cause the gas to flow faster than the solids in the piping. Under these circumstances, the RPDS usually smoothly and reliably de-pressurizes the solids. It also has some advantages over a lockhopper as a depressurization device (e.g., the flow of the solids is continuous, and valve maintenance time and costs are decreased). However, if, e.g., the gas flow rate is increased to too great an extent, the whole de-pressurizing process is handicapped due to the fluidization of the solids in the de-entrainment vessel. The fluidization of the solids is detrimental to the function of the device since restriction to solids flow is destroyed, and the flow of the solids becomes uncontrollable. Therefore, it is very important to guard against fluidization of solids, to guarantee the smooth running of the entire process.

SUMMARY OF THE INVENTION

The invention provides a method and an apparatus to ensure the proper function of a de-pressurization system utilizing an RPDS in various process situations. The present invention—in a significant departure from the conventional system discussed above—has solved the problem of deterioration of de-pressurization capability even when the conditions under which fluidization would normally take place if the conventional technique existed, by preventing the possibility of fluidization of the solids. This is accomplished in accordance with the method of the present invention by decreasing the flow velocity of the gas prior to or when discharging the gas into the packed bed of solids in the de-entrainment vessel.

In one exemplary apparatus according to the invention, the cross-sectional area of the opening through which the gas and solid streams are discharged into the bed of solids in the de-entrainment vessel is larger than the cross-sectional area of the pipe introducing the gas and solid streams into the de-entrainment vessel and used for pressure release of the gas. The reduction of the velocity of the gas discharging into the de-entrainment vessel is preferably accomplished immediately prior to or when discharge of the gas takes place since it is advantageous to maintain a higher velocity as long as possible in order to achieve a large enough pressure loss in the transporting pipe. According to the invention, the discharge of the gas-solids stream into the de-entrainment vessel can be designed to be optimal independently of the pressure reduction effects in the transporting pipe.

According to one aspect of the present invention, a method of reducing the pressure of a high pressure solids-gas stream, and separating the solids from the solids-gas stream, is provided. The method utilizes a de-entrainment vessel including a packed bed of solids, a solids outlet, a gas outlet above the level of the packed bed connected to a low pressure area, and an inlet for the solids-gas stream into the vessel. The method comprises the steps of substantially continuously: (a) introducing the high pressure solids-gas stream into the de-entrainment vessel through the inlet so that the gas of the solids-gas stream flows faster than the solids, to provide a pressure drop of the gas; (b) causing the gas from the solids-gas stream of step (a) to flow through the packed bed of solids; (c) causing the velocity of the gas to decrease during, or just prior to, introduction of the gas into the packed bed of solids, to minimize the possibility of fluidization of the solids; (d) discharging the gas separated from the solids-gas stream, after it has passed through the packed bed, through the gas outlet and transporting it to a low pressure area; and (e) discharging solids from the vessel below the level of the packed bed.

During the practice of the method steps (a)–(e), the temperature of the gas-solids stream, and bed solids, is between about 800°–1200° C. There may also be the further step of cooling the gas-solids stream so that it has a temperature of about 300°–799° C. prior to step (b). The gas-solids stream typically has a pressure of about 2–20 bar, and steps (d) and (e) are typically practiced to discharge the separated gas and solids to substantially atmospheric pressure areas.

The method may also include the further step of dividing the solids-gas stream into a plurality of streams prior to step (b). There also may be the additional step of further minimizing the possibility of fluidization of the solids by passing the gas, after or simultaneously with step (b), through an element permeable to gas but substantially impermeable to solids within the gas-solids stream or the packed bed.

According to another aspect of the present invention, apparatus for reducing the pressure of a high pressure solids-gas stream and separating the solids from the solids-gas stream is provided. The apparatus comprises the following elements: A substantially vertical de-entrainment vessel having a bed of packed solids therein, disposed at a level within the vessel, and a side wall. A transporting pipe having a first cross-sectional area and containing the solids-gas stream therein at a super-atmospheric pressure. Inlet means connected to said transporting pipe, and disposed within the de-entrainment vessel, and including a discharge opening below the level of the bed of packed solids, the inlet means at the discharge opening having a second effective cross-sectional area significantly greater than the first cross-sectional area, so as to minimize the possibility of fluidization of the solids. A gas outlet from the vessel is located above the level of the bed of solids, and is connected to an area having a lower pressure than the pressure in the transporting pipe; and a solids outlet from the vessel is located below the level of the bed of solids, and is connected to an area having a lower pressure than the pressure in the transporting pipe.

In the apparatus described above, the inlet means may include a gradually expanding cross-sectional area section (e. g., right circular cone) at the discharge opening. A plurality of openings may be provided in the cone, below the level of the packed bed of solids, through which gas flows toward (that is with at least a velocity component toward) the vessel wall.

The apparatus also preferably further comprises additional means, for substantially preventing fluidization, comprising a substantially gas permeable and substantially solids impermeable element operatively connected to the inlet means adjacent the discharge opening disposed in the pathway of gas from the inlet means to the gas outlet. The fluidization preventing means element may be directly connected to the inlet means adjacent the discharge opening, and extends from the inlet means toward the vessel wall; in fact, the fluidization preventing means element may cover substantially the entire area between the inlet means and the vessel side wall, substantially defining the upper level of the packed bed of solids. The fluidization preventing means element typically is selected from perforated plates, wire mesh screens, and filtering means (e.g., ceramic filters). The fluidization preventing means element may also have uniform or varying gas permeability. For example, the gas permeability of the fluidization preventing means element may be lowest closest to the inlet means, and greatest closest to the vessel side wall, and may gradually increase from the inlet means toward the vessel side wall.

In the apparatus described above, the transporting pipe may optionally comprise a single transporting pipe having the first cross-sectional area, and the inlet means may comprise a plurality of inlet elements connected to and branching from the single transporting pipe. In this case, the inlet elements collectively having a second cross-sectional area significantly greater than the first cross-sectional area. Also, under some circumstances and process parameters, the solids outlet may comprise a plurality of outlet elements, and the gas outlet may comprise a plurality of outlet elements.

The apparatus described above may be in combination with a pressurized fluidized bed reactor having a pressure of about 2–20 bar, and connected to the transporting pipe. Also, there optionally is a cooling means disposed between the reactor and the inlet means for cooling the temperature of the solids-gas stream to about 300°–799° C.

According to another aspect of the present invention, an apparatus for the same purpose is provided comprising the following elements: A substantially vertical de-entrainment vessel having a bed of packed solids therein, disposed at a level within the vessel, and a side wall. A transporting pipe containing the solids-gas stream therein at a super-atmospheric pressure. Inlet means connected to the transporting pipe, and disposed within the de-entrainment vessel, and including a discharge opening below the level of the bed of packed solids. A gas outlet from the vessel located above the level of the bed of solids, and connected to an area having a lower pressure than the pressure in the transporting pipe. A solids outlet from the vessel is located below the level of the bed of solids, and is connected to an area having a lower pressure than the pressure in the transporting pipe; and means, for substantially preventing fluidization, comprising a substantially solids impermeable and a substantially gas permeable element is operatively connected to the inlet means and extends toward the vessel side wall. The fluidization means is preferably as described above, with respect to the previous apparatus aspect of the invention.

It is a primary object of the present invention to efficiently and effectively reduce the pressure of a high temperature and pressure solids-gas stream, while separating the solids and gas of the stream, using a de-entrainment vessel, with minimal fluidization of the solids. This and other objects of the invention will be apparent from the detailed description of the invention, and from the appended claims.

DETAILED DESCRIPTION OF THE DRAWINGS

Figure 1:
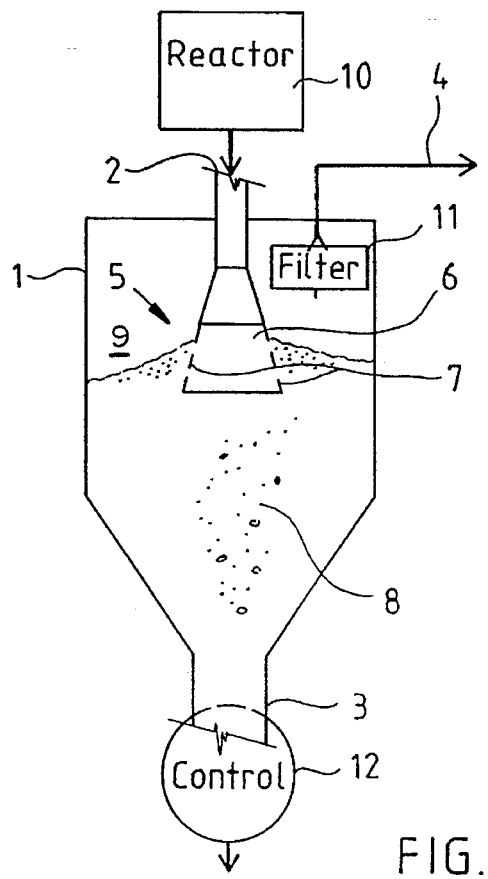
FIG. 1 is a schematic side cross-sectional view of a first exemplary embodiment of apparatus according to the present invention, for practicing a method of gas-solids stream pressure reduction, and solids and gas separation, according to a method of the invention.

The invention exemplary apparatus illustrated in FIG. 1 for conveying solid material particles in gas from higher pressure to lower, e.g., atmospheric, pressure, utilizing an RPDS, comprises as a main component a vertical de-entrainment vessel 1, and means for conveying the solids-and-gas stream through transporting pipe 2 into the de-entrainment vessel 1. The transporting pipe 2 is operatively connected to a pressurized reactor, such as the pressurized fluidized bed reactor 10 shown schematically in FIG. 1, from which the stream of solids and gas is discharged. In reactor 10, reactions take place at high pressure, e.g., about 2–20 bar, and at high temperature, e.g., about 1200° C. In order to have the pressure of the gas decreased the gas is arranged to flow faster than the solid material in the transporting pipe 2 before and/or while discharging into the de-entrainment vessel 1.

The transporting pipe 2 is, according to the embodiment illustrated in FIG. 1, located in the upper section of the de-entrainment vessel 1, and is substantially vertical; however, pipe 2 may also be positioned in other locations and with other orientations with respect to vessel 1. An inlet means 5 with expanding section 6 is attached at the end of the transporting pipe 2. The expanding section (e.g., right circular cone) 6 may also include a plurality of discharge openings 7 of suitable size and shape, adjacent the free open end (and end discharge opening) thereof, as seen in FIG. 1. Both the end of cone 6 and the openings 7 are below the level of particles in bed 8. The flow area determined by the periphery walls of the section 6 increases as the solids and gas in the transporting pipe 2 flow through the inlet means 5. The gas forces its way towards the circumferential edge or edges at the end of the inlet means 5 and separates from the solids. Thus the expanding area provides an increased area for the gas to separate from the solids, which lowers the velocity of the gas. The elements 2 and 6 are preferably substantially circular in cross section (e.g., the element 6 being conical), but may have a polygon or other cross-sectional shape.

The gas separated from the solids in vessel 1 is subsequently vented out of the vessel 1 through an outlet 4. The gas outlet 4 is situated in a gas space 9 of the de-entrainment vessel 1 above the level of the bed of solids 8, and may be equipped with an appropriate conventional filter element 11, if desired. The gas flowing through outlet 4 is discharged to a lower pressure (e.g., atmospheric) area.

A low gas purging velocity is necessary to avoid local fluidization or formation of channels in the packed bed of solids 8. Any fluidization or channelling of the packed bed of solids 8 severely hampers its ability to achieve good pressure reduction. The solids separated from the gas are continuously removed from the de-entrainment vessel 1 through a solids outlet 3, preferably situated in the lower section of the vertical de-entrainment vessel 1. The outlet 3 is, according to the embodiment illustrated in FIG. 1, located along the vertical center line of the de-entrainment vessel 1, but within the scope of the present invention it may be located in any suitable location, and several outlets may be employed instead of the one (3) illustrated in FIG. 1. The outlet 3 may have a conventional control device 12, and is connected to a lower (e.g., atmospheric) pressure area.

Figure 2:
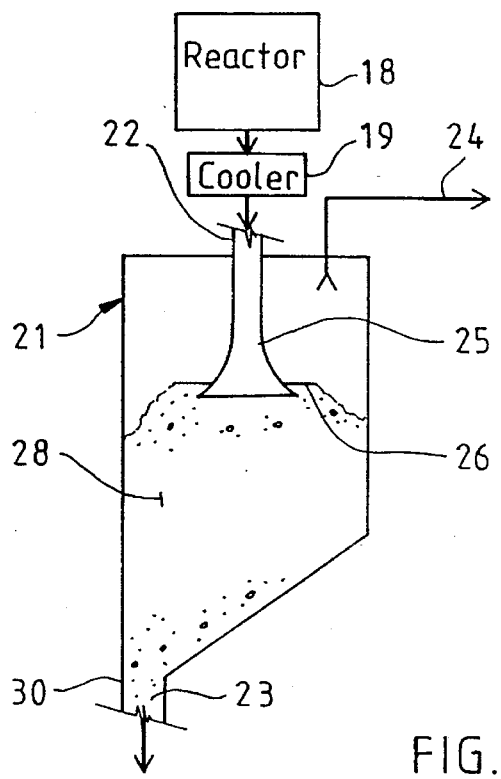
FIG. 2 is a view like that of FIG. 1 for a second exemplary embodiment.

In FIG. 2 there is illustrated another exemplary embodiment of apparatus according to the present invention. The hot solids and gaseous materials from reactor 18 may pass through a cooling means 19, and then are transported into a substantially vertical de-entrainment vessel 21 through a transporting pipe 22 connected to an inlet means 25 of the de-entrainment vessel 21. The inlet means 25 is attached at the end of the transporting pipe 22. The flow area increases as the solids and gas in the transporting pipe 22 flow through the inlet means 25. The gas forces its way towards the circumferential edge or edges at the end of the inlet means 25 and separates from the solids.

The risk of any local fluidization in vessel 21 is essentially eliminated by the preventing means 26 attached to the inlet means 25 at its lower end. The preventing means 26 may also be attached to the periphery, or edge, of the inlet means 25. The preventing means 26 acts as a restraint on top of the packed bed of solids 28 thus minimizing the risk of local fluidization as the gas pushes its way up through a section of the topmost layer of solids bed 28 around the periphery of the inlet means 25. Preferably the preventing means 26 is a gas permeable plate or disc, e.g., made from a wire mesh screen or perforated metal or ceramic plate, or it may comprise a filter, such as a ceramic filter which separates any particles which tend to be entrained by the gas from bed 28.

The gas separated from the solids in de-entrainment vessel 21 is subsequently vented out of the vessel 21 through an outlet 24 for gas. A low gas velocity in inlet means 25 is necessary to avoid local fluidization or formation of channels in the packed bed of solids 28. The solids separated from the gas are continuously removed from the de-entrainment vessel 21 through a solids outlet 23 situated—in the particular embodiment of FIG. 2—adjacent to a side wall 30 of the de-entrainment vessel 21.

Figure 3:
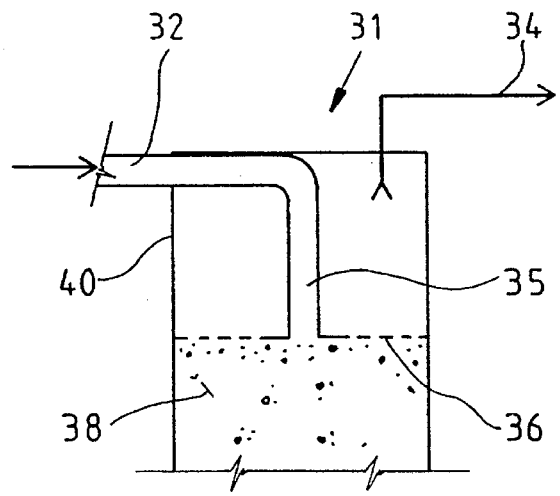
FIG. 3 is a view like that of FIG. 1 for a third exemplary embodiment, with the bottom of the vessel cut away for clarity of illustration.

FIG. 3 shows still another exemplary embodiment of apparatus according to the invention. A substantially upright (vertical), substantially circular in cross-section de-entrainment vessel 31 is equipped with a gas and solids transporting pipe 32 which is substantially horizontal where it enters the de-entrainment vessel 31 through a side wall 40, and includes an inlet means 35, provided with a fluidization preventing means 36, at the bottom of a vertical section of pipe 32. A gas outlet 34 is also provided. The outlet for separated solids is not shown in FIG. 3; however, any suitable arrangement known by a person skilled in the art may be applied.

The inlet fluidization preventing means 36 is permeable to gas and substantially impermeable to solids. As schematically illustrated in FIG. 3, the fluidization preventing means 36 preferably has almost no gas permeability (e.g., is essentially solid) at the region thereof nearest the inlet means 35, with gradually increasingly greater gas permeability from the inlet 35 to the side wall 40 of the vessel 31. In this way it is possible to gain the benefits of the present invention substantially without having any enlargement of the discharge opening 35 itself, but merely by having the fluidization preventing means 36 first act as an enlarged flow path of the gas thus causing the reduced velocity and, after the gas permeability of the preventing means 36 is increased, then acting as a gas permeable, solid impermeable, device. While the fluidization preventing means 36 is illustrated as horizontal in FIG. 3 it may alternatively be disposed at an angle to the horizontal. Gas outlet 34 may be provided with a filtering device (i.e., like device 11 in FIG. 1), and is well above the level of particle bed 38.

Figure 4:
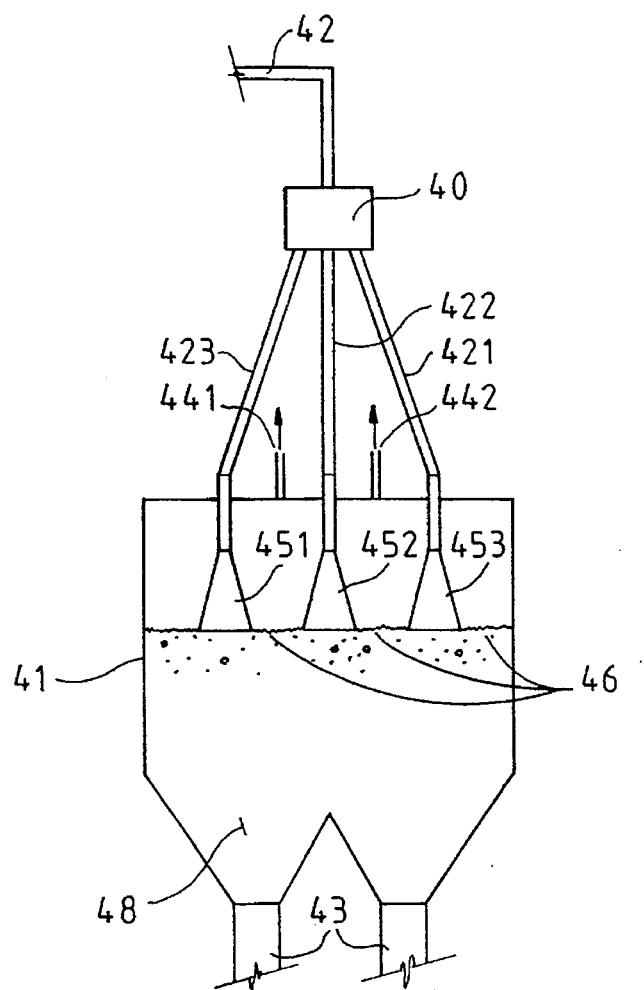
FIG. 4 is a view like that of FIG. 1 for a fourth exemplary embodiment of apparatus according to the invention.

FIG. 4 illustrates still another exemplary embodiment of apparatus according to the present invention which is preferred for the transport of finer solids materials. For the large de-entrainment vessel 41 multiple (branch) transporting lines 423, 422, 421 from transporting pipe 42 are adapted to discharge the solids and gaseous material into the interior of the de-entrainment vessel 41, each line 421, 422, 423 provided with its own inlet means (e.g., cones) 453, 452, and 451, respectively. A fluidization preventing means 46 (e.g., a perforated plate or wire mesh screen, or ceramic filter)

preferably covers the entire interior of the vessel 41 cross section (which is typically circular but may be of another shape) above the particle bed 48. The separated-out gas is subsequently vented out of the de-entrainment vessel 41 through gas outlets 441, 442. The number of the inlets 421–423 and outlets 441–442 is dependent upon the process parameters.

In the FIG. 4 embodiment, the desired lower gas velocity is accomplished by splitting the initial stream in pipe 42 into a plurality of lines (e.g., 2, 3, or more), while simultaneously maintaining the desired pressure reduction. A plurality of solids outlets 43 are also provided, the number depending upon the process parameters and the shape of the vessel 41. In order to facilitate division of the stream of gas and solids into several lines, a splitting means 40 is provided in the transporting pipe 42 above vessel 41.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method, for a solids-gas stream having a high pressure, of reducing the pressure of the solids-gas stream, and separating solids from the solids-gas stream, utilizing a de-entrainment vessel including a packed bed of the solids having an upper level, a solids outlet, a low pressure open space above the level of the packed bed, a gas outlet adjacent the low pressure open space and above the level of the packed bed, and two or more inlets for the solids-gas stream into the vessel, the inlets having outlets at or below the upper level of the packed bed of the solids, said method comprising the steps of substantially continuously:

(a) introducing the high pressure solids-gas stream into the de-entrainment vessel through the inlets so that gas of the solids-gas stream flows faster than the solids, to provide a pressure drop of the gas;

(b) causing the gas from the solids-gas stream of step (a) to flow from above the packed bed of the solids through the packed bed of the solids so that the packed bed of the solids dissipates kinetic energy of the solids-gas stream, and to flow into the low pressure open space;

(c) causing a velocity of the gas to decrease during, or just prior to, introduction of the gas into the packed bed of the solids, to minimize a possibility of fluidization of the solids in the packed bed;

(d) after the gas has passed through the packed bed and entered the low pressure open space, discharging the gas separated from the solids-gas stream through the gas outlet and transporting it to a low pressure area; and (e) discharging the solids through the solids outlet from the vessel below the level of the packed bed.

2. A method as recited in claim 1 further comprising practicing the steps (a)–(e) with a temperature of the solids-gas stream, and the solids of the packed bed, being between about 800°–1200° C.

3. A method as recited in claim 1 wherein the high pressure of the solids-gas stream is about 2–20 bar and the low pressure area is at substantially atmospheric pressure, and wherein said gas discharging transports the gas to the substantially atmospheric pressure area.

4. A method as recited in claim 1 further comprising the step of dividing the solids-gas stream into a plurality of streams prior to step (a).

5. A method as recited in claim 1 further comprising the step of further minimizing the possibility of fluidization of the solids in the packed bed by passing the gas, after or simultaneously with step (b), through an element permeable to the gas but substantially impermeable to the solids within the solids-gas stream or the packed bed.

6. Apparatus, for a high pressure solids-gas stream having a superatmospheric pressure, for reducing the pressure of the solids-gas stream and separating solids from the solids-gas stream, said apparatus comprising:

a substantially vertical de-entrainment vessel having a packed bed of the solids disposed at a level within said vessel, an open space above the level, and a side wall;

a transporting pipe containing the solids-gas stream therein at the superatmospheric pressure;

an inlet connected to said transporting pipe where the pipe has a first cross-sectional area, and disposed within said de-entrainment vessel and extending from above the level of the packed bed to at least the level of the packed bed of the solids, and including two or more discharge openings at or below the level of the packed bed of the solids, said discharge openings having a combined second effective cross-sectional area significantly greater than said first cross-sectional area of said transporting pipe, to minimize a possibility of fluidization of the solids in the packed bed;

a gas outlet from said vessel located above the level of the packed bed of the solids and in communication with the open space in the vessel, and connected to an area having a lower pressure than the pressure in said transporting pipe, wherein a pathway for gas separated from the solids-gas stream is defined from the inlet, through the packed bed of the solids, through the open space in the vessel, and to the gas outlet; and a solids outlet from said vessel located below the level of the packed bed of the solids, and connected to an area having a lower pressure than the pressure in said transporting pipe.

7. Apparatus as recited in claim 6 wherein said inlet includes a gradually expanding cross-sectional area section at each said discharge opening.

8. Apparatus as recited in claim 7 wherein each said expanding cross-sectional area section comprises a cone.

9. Apparatus as recited in claim 8 wherein each said cone is a right circular cone.

10. Apparatus as recited in claim 6 further comprising means for substantially preventing fluidization of the solids in the packed bed, said means comprising a gas permeable and substantially solids impermeable element connected to said inlet adjacent said discharge openings and disposed in the pathway of the gas.

11. Apparatus as recited in claim 10 wherein said fluidization preventing means element is directly connected to said inlet adjacent said discharge openings, and extends from said inlet toward said vessel wall.

12. Apparatus as recited in claim 11 wherein said fluidization preventing means element extends substantially across an entire area between said inlet and said vessel side wall, substantially defining the level of the packed bed of the solids.

13. Apparatus as recited in claim 10 wherein said fluidization preventing means element comprises a perforate plate, a wire mesh screen, or a filter.

14. Apparatus as recited in claim 13 wherein said filter comprises a ceramic filter.

15. Apparatus as recited in claim 6 wherein said transporting pipe comprises a single transporting pipe having said first cross-sectional area, and wherein said inlet comprises a plurality of inlet elements connected to and branching from said single transporting pipe, each of said inlet elements having at least one of said discharge openings.

16. Apparatus as recited in claim 6 wherein said inlet comprises a plurality of inlet elements, each of said inlet elements having at least one of said discharge openings, and wherein said solids outlet comprises a plurality of outlet elements, and wherein said gas outlet comprises a plurality of outlet elements.

17. Apparatus, for a high pressure solids-gas stream having a superatmospheric pressure, for reducing the pressure of the solids-gas stream and separating solids from the solids-gas stream, said apparatus comprising:
   a substantially vertical de-entrainment vessel having a packed bed of the solids disposed at a level within said vessel, an open space above the level, and a side wall;
   a transporting pipe containing the solids-gas stream therein at the superatmospheric pressure;
   an inlet connected to said transporting pipe, and disposed within said de-entrainment vessel, and including two or more discharge openings at or below the level of the packed bed of the solids;
   a gas outlet from said vessel located above the level of the packed bed of the solids and in communication with the open space in the vessel, and connected to an area having a lower pressure than the pressure in said transporting pipe, wherein a pathway for gas separated from the solids-gas stream is defined from the inlet, through the packed bed of the solids, through the open space in the vessel, and to the gas outlet;
   a solids outlet from said vessel located below the level of the packed bed of the solids, and connected to an area having a lower pressure than the pressure in said transporting pipe; and
   means for substantially preventing fluidization, said means comprising a gas permeable and substantially solids impermeable element connected to said inlet and extending toward said vessel side wall.

18. Apparatus as recited in claim 17 wherein said fluidization preventing means element extends substantially across an entire area between said inlet and said vessel side wall, defining the level of the packed bed of the solids.

19. Apparatus as recited in claim 17 wherein said fluidization preventing means element comprises a perforate plate, a wire mesh screen, or a filter.

20. Apparatus as recited in claim 19 wherein said filter comprises a ceramic filter.

21. Apparatus as recited in claim 17 further comprising a plurality of branch pipes in between and connected to said inlet and said transporting pipe, and means external of said vessel for splitting the solids-gas stream in said transporting pipe into said branch pipes; and wherein said inlet comprises an inlet element at an end of each said branch pipe opposite said splitting means.

22. A method, for a solids-gas stream having a high pressure, of reducing the pressure of the solids-gas stream, and separating solids from the solids-gas stream, utilizing a de-entrainment vessel including a packed bed of the solids having an upper level, a solids outlet, a low pressure open space above the level of the packed bed, a gas outlet adjacent the low pressure open space and above the level of the packed bed, and two or more inlets for the solids-gas stream into the vessel, the inlets having outlets at or below the upper level of the packed bed of the solids, said method comprising the steps of substantially continuously:
   (a) introducing the high pressure solids-gas stream into the de-entrainment vessel through the inlets so that gas of the solids-gas stream flows faster than the solids, to provide a pressure drop of the gas;
   (b) causing the gas from the solids-gas stream of step (a) to flow through the packed bed of the solids, and to flow into the low pressure open space;
   (c) causing a velocity of the gas to decrease during, or just prior to, introduction of the gas into the packed bed of the solids, to minimize a possibility of fluidization of the solids in the packed bed;
   (d) discharging the gas separated from the solids-gas stream, after it has passed through the packed bed and into the low pressure open space, through the gas outlet and transporting it to a low pressure area;
   (e) discharging the solids through the solids outlet from the vessel below the level of the packed bed; and
   (f) further minimizing the possibility of fluidization of the solids in the packed bed by passing the gas, after or simultaneously with step (b), through an element permeable to the gas but substantially impermeable to the solids within the solids-gas stream or the packed bed.

23. Apparatus, for a high pressure solids-gas stream having a superatmospheric pressure, for reducing the pressure of the solids-gas stream and separating solids from the solids-gas stream, said apparatus comprising:
   a substantially vertical de-entrainment vessel having a packed bed of the solids disposed at a level within said vessel, an open space above the level, and a side wall;
   a transporting pipe containing the solids-gas stream therein at the superatmospheric pressure;
   an inlet connected to said transporting pipe where the pipe has a first cross-sectional area, and disposed within said de-entrainment vessel, and including discharge openings at or below the level of the packed bed of the solids to introduce the solids-gas stream into the packed bed of the solids so that the packed bed of the solids is that which dissipates kinetic energy of the solids-gas stream, said inlet at said discharge openings having a combined second effective cross-sectional area significantly greater than said first cross-sectional area, to minimize a possibility of fluidization of the solids in the packed bed;
   a gas outlet from said vessel located above the level of the packed bed of the solids and in communication with the open space, and connected to an area having a lower pressure than the pressure in said transporting pipe, wherein a pathway for gas separated from the solids-gas stream is defined from the inlet, through the packed bed of the solids, through the open space, and to the gas outlet;
   a solids outlet from said vessel located below the level of the packed bed of the solids, and connected to an area having a lower pressure than the pressure in said transporting pipe; and
   a gas permeable and substantially solids impermeable element connected to said inlet and adjacent said discharge openings and disposed in the pathway of the gas.

\* \* \* \* \*